United States Patent [19]
Toms, II

[11] 3,708,093
[45] Jan. 2, 1973

[54] AUTOMOBILE HANGER BRACKET
[76] Inventor: Nathaniel C. Toms, II, P.O. Box 7631, Courthouse Station, Asheville, N.C. 28806
[22] Filed: May 17, 1971
[21] Appl. No.: 143,904

[52] U.S. Cl. .................224/42.45 A, 224/42.46 A
[51] Int. Cl. ..............................................B60r 7/00
[58] Field of Search ...224/42.45 A, 42.46 A, 42.1 C, 224/42.1 CA, 29 C, 42.45 R, 42.46 R, 29 R, 42.42 R; 108/46

[56] References Cited

UNITED STATES PATENTS

| 3,002,666 | 10/1961 | Silverman | 224/42.45 A |
| 2,949,334 | 8/1960 | Amerpohl | 108/46 |
| 3,275,161 | 9/1966 | Robertson | 224/42.45 A X |
| 2,728,503 | 12/1955 | Kramer | 224/45 T X |

Primary Examiner—Gerald M. Forlenza
Assistant Examiner—Jerold M. Forsberg
Attorney—Hunt, Heard & Rhodes

[57] ABSTRACT

The bracket includes a frame adapted to be suspended from the hook conventionally provided within an automobile above each side window, and further includes a stabilizing rod carrying an abutment member and readily adjustable relative to the frame and the automobile window to securely position the abutment member against the window irrespective of the latter's inclination or spacing from the hook. The abutment member preferably comprises either a cylindrical rubber bumper or a suction cup. The bracket is so constructed as to possess desirable safety features.

8 Claims, 3 Drawing Figures

PATENTED JAN 2 1973

3,708,093

INVENTOR.
NATHANIEL C. TOMS II
BY
Hunt, Heard & Rhodes

AUTOMOBILE HANGER BRACKET

BACKGROUND OF THE INVENTION

This invention relates to automobile hanger brackets of the type adapted to be suspended from one of the hooks conventionally provided within an automobile body, above and adjacent each side window of the automobile, for the purpose of more conveniently and/or neatly supporting a plurality of garment hangers therefrom.

U.S. Pat. No. 3,002,666 discloses a hanger bracket of the aforesaid type which is adapted to be suspended from one of the hooks conventionally provided within an automobile and which includes stabilizing flanges adjacent its inner end adapted to abut the adjacent interior wall of the automobile. The stabilizing flanges are formed integrally with the main body portion of the hanger and are not adjustable relative to it. Other known hanger brackets have stabilizing abutment members which are adapted to engage the adjacent side window of the automobile, but which are similarly incapable of adjustment relative to the bracket and the window. This severely limits the utility of such hanger brackets, since with modern styling trends the vertical inclination of an automobile side window and/or its lateral position relative to the hook thereabove may vary greatly from automobile to automobile. Brackets of many different sizes and shapes must therefore be manufactured and stocked in inventory to insure the availability of one suitable for use in any given automobile. This necessarily increases the cost of the brackets, which cost desirably should be as low as possible, and therefore detracts from the brackets' saleability and appeal to prospective purchasers and users.

Another deficiency of known hanger brackets resides in their lack of proper safety features. Some have quite sharp free end portions or corners, and/or are of a completely rigid and virtually unbreakable construction. These constitute a severe safety hazard, since capable of seriously injuring a passenger within the automobile who might be thrown against the bracket by the automobile's movement. Such an occurrence might transpire during ordinary use of the automobile, and of course would be even more likely to transpire if the automobile should become involved in a collision.

SUMMARY OF THE INVENTION

With the foregoing in mind, the present invention provides an automobile hanger bracket capable of being economically mass-produced and of being quickly and easily adjusted so as to be usable in a highly satisfactory manner within virtually any automobile, irrespective of the inclination of the side window of such automobile or its spacing from the adjacent hook customarily provided thereabove, the bracket being so constructed as to also possess certain highly desirable safety features which minimize if not altogether obviate the possibility of passenger injury being occasioned thereby.

In a preferred embodiment of the invention, the hanger bracket includes an elongate frame adapted to extend generally laterally within the automobile body, vertical support means adapted to engage the automobile hook and suspend the aforesaid frame therefrom, an elongate frame-stabilizing member carrying abutment means at one end thereof, and means so interconnecting the other end of the stabilizing member and the bracket frame as to permit convenient positional adjustment of the stabilizing member and the abutment means relative to the frame and to the automobile window adapted to be engaged by the abutment means. The abutment means preferably comprises either an elongate rubber bumper member or a suction cup, and the stabilizing member preferably comprises an exteriorally threaded rod which is received within and is adjustably movable longitudinally of an interiorally threaded bore provided within a portion of the bracket frame which extends in co-planar angular relationship to a generally horizontally extending frame portion having a plurality of longitudinally spaced notches therein for reception of conventional clothes hangers.

The aforesaid portions of the bracket frame are free from sharp corners, edges and the like, and terminate at and merge smoothly with a rounded free-end portion of the frame which is similarly unlikely to cause injury to an automobile passenger accidentally engaging the same. To further minimize the possibility of passenger injury, even if a passenger should be thrown violently against the hanger bracket, the bracket is preferably so constructed as to break when subjected to severe stress. The breakable construction of the bracket in no way lessens or detracts from its utility and durability under conditions of normal use, but constitutes a highly desirable safety feature.

DESCRIPTION OF THE DRAWING

Other features and advantages of the invention will be in part apparent and in part pointed out hereinafter, in the following description of illustrative embodiments thereof, which should be read in conjunction with the accompanying drawing, in which.

DESCRIPTION OF THE PREFERRED EMBODIMENT

Figure 1:
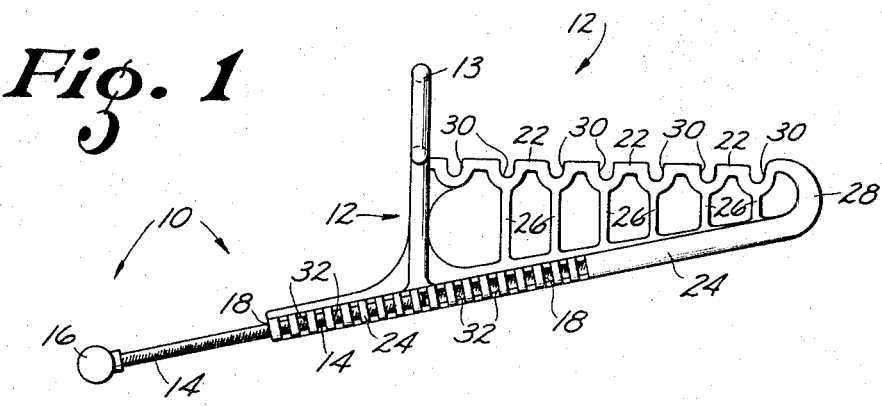
FIG. 1 is a side elevational view of a hanger bracket embodying the invention.
Figure 2:
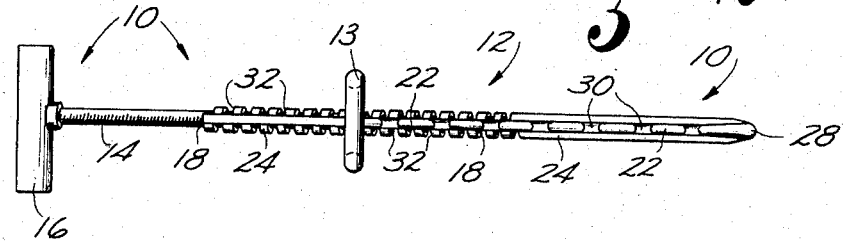
FIG. 2 is a top plan view of the hanger bracket of FIG. 1.

The hanger bracket identified in its entirety in FIGS. 1 and 2 by the numeral 10 generally includes an elongate frame 12, vertical support means in the form of an annular member 13 which extends upwardly from frame 12 adjacent one end thereof and is adapted to receive the hook member (not shown) customarily provided within the interior of an automobile and to suspend frame 12 therefrom, an elongate frame-stabilizing member in the form of a rod 14, abutment means in the form of a generally cylindrical soft-rubber bumper member 16 secured to one end of rod 14 and extending substantially normal thereto for engagement with the automobile side window (not shown) customarily disposed beneath the aforesaid hook member, and means including an interiorally threaded bore 18 provided within frame 12 and interconnecting it and rod member 14 in such a manner as to permit positional adjustment of rod 14 and bumper member 16 relative to frame 12 and to the automobile side window adapted to be engaged by member 16. Frame 12 and annular member 13 may advantageously be, and preferably are, formed simultaneously and integrally with one another in a molding operation from a suitable plastic material having desired strength and breaking characteristics hereinafter discussed.

Frame 12 more specifically includes an elongate upper edge portion 22 and a lower base portion 24 which are interconnected along their lengths by a discontinuous web portion 26 and which merge smoothly at the free end of frame 12 (to the right, as viewed in the drawing) with a smooth rounded frame portion 28 there provided. All of the aforesaid portions of frame 12 are co-planar and are free from sharp corners, edges or the like capable of injuring an automobile passenger engaging bracket 10. Upper edge portion 22 of frame 12 extends generally horizontally during use of bracket 10 and is provided along its length with a plurality of spaced upwardly opening notches 30 adapted to receive conventional garment hangers (not shown). Lower base portion 24 of frame 12 extends angularly downwardly relative to upper edge portion 22, at an angle of approximately 30° and from their common connections with the right end portion 28 of frame 12, and at its left end base portion 24 projects beyond the left end of upper edge portion 22 and the annular member 13 extending upwardly therefrom. Threaded bore 18 extends longitudinally of frame base portion 24 along approximately two-thirds of its length and opens through its left end. Weakening indentations 32 are preferably provided along that section of frame portion 24 containing bore 18, which indentations 32 may as shown be of such a depth as to communicate with bore 18.

Rod member 14 is provided on its exterior surface with screw threads matable with those within bore 18. That end of rod 14 distal from bumper member 16 (i.e., the right end of rod 14 as viewed in FIGS. 1 and 2) is received within and extends co-axially of bore 18, and therefore extends angularly relative to upper edge portion 22 of frame 12. Upon rotation of rod 14 in the appropriate direction, it will be apparent that the position of the rod and of bumper member 16 can be quickly and easily adjusted relative to frame 12 and to the side window (not shown) of the automobile within which bracket 10 is used, so as to bring member 14 into firm engagement with such automobile window irrespective of the latter's vertical inclination and/or lateral spacing from the automobile hook customarily provided thereabove and then engaged by annular member 13. By virtue of the aforesaid adjustment capability, bracket 12 enjoys a wide versatility of utilization, and can be quickly and easily installed and advantageously used within virtually any automobile.

When mounted as aforesaid within an automobile, upper edge portion 22 of bracket frame 12 extends generally horizontally and laterally of the automobile, and bumper member 16 extends generally longitudinally of the automobile in engagement with its side window to thus firmly stabilize the bracket. The soft-rubber construction of member 14 insures that the latter will not scratch or otherwise mar the automobile window, while maintaining positive engagement therewith.

Figure 3:
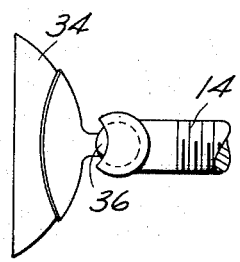
FIG. 3 is a fragmentary view of an alternative embodiment of the abutment means of the hanger bracket.

If even more positive engagement with the automobile window is desired, the alternative abutment means shown in FIG. 3 may be used in lieu of the cylindrical rubber bumper member 16 previously described. The alternative abutment means shown in FIG. 3 comprises a suction-cup member 34 secured by a ball-and-socket connector 36 to the free left end of rod member 14. The ball-and-socket connector 36 enables suction-cup member 34 to establish and maintain good engagement with the automobile side window irrespective of the latter's inclination relative to the vertical.

As has been previously noted, free end portion 28 and all other portions of frame 12 are free from sharp corners, edges or the like capable of injuring an automobile passenger casually engaging the same. Frame 12 is constructed so as to possess sufficient strength and rigidity to withstand any such engagements or impacts which are of a minor nature, and to permanently withstand breakage or failure under all conditions of normal use. However, frame 12 is also so constructed as to break when subjected to the more extreme impacts or stresses as would be occasioned by an automobile passenger being thrown violently against bracket 10, which breakage-capability greatly lessens the possibility of passenger injury under the aforesaid conditions. The "breakability" of frame 10 is realized by proper selection of the plastic material from which the frame is preferably formed, and by the discontinuous nature of the web portion 26 interconnecting its upper edge portion 22 and lower base portion 24, and by the weakening indentations 32 provided along that section of base portion 24 containing bore 18. By reason of the weakening indentations 32, rod 14 would normally break free from bore 18 and drop to the floor of the automobile if bracket 10 should be subjected to an impact or stress of the extreme type described above. To further lessen the possibility of passenger injury, rod 14 may be and preferably is also formed of a breakable plastic material comparable to that employed for the formation of frame 12 and annular member 13.

It will thus be seen that there has been provided an automobile hanger bracket possessing all of the advantages and features hereinbefore noted, together with many practical benefits. Although preferred embodiments of the invention have been specifically shown and described, it is to be understood that this was for purposes of illustration only, and not for purposes of limitation, the scope of the invention being in accordance with the following claims.

That which is claimed is:

1. A hanger bracket adapted for use in an automobile having a hook member and a side window disposed in vertically spaced adjacent relationship to each other therewithin, said bracket comprising:

an elongate frame adapted to extend generally laterally of said automobile, said frame including an upper edge portion having a plurality of hanger-receiving notches spaced along the length thereof, a lower base portion, and a discontinuous web portion interconnecting said upper edge portion and said lower base portion, said portions of said frame being substantially coplanar and said lower base portion extending angularly relative to said upper edge portion of said frame, one end of said upper edge portion and said lower base portion of said frame merging together forming a free end of the frame, and said lower base portion of said frame projecting beyond said upper edge portion of said frame at the end thereof opposite said free end portion of said frame;

vertical support means carried by said frame, said support means being adapted to receive said hook member and suspend said frame therefrom;

an elongate frame-stabilizing member;

abutment means carried by said stabilizing member adjacent one end thereof, said abutment means being adapted to engage said automobile window; and adjustable means interconnecting said stabilizing member adjacent the other end portion thereof and said lower base portion permitting longitudinal positional adjustment of said stabilizing member and said abutment means lengthwise of the lower base portion to engage said automobile window.

2. A bracket as in claim 1, wherein said support means comprises an annular member formed integrally with and projecting substantially vertically upwardly from said frame.

3. A bracket as in claim 1, wherein said lower base portion of said frame includes an interiorally threaded bore extending therethrough and forming part of said interconnecting means, said stabilizing member comprising an exteriorally threaded rod mounted adjacent said other end thereof within said bore and rotatable about its longitudinal axis for said positional adjustment.

4. A bracket as in claim 3, wherein said lower base portion of said frame further has a plurality of weakening indentations therein adjacent said bore.

5. A hanger bracket adapted for use in an automobile having a hook member and a side window disposed in vertically and laterally spaced adjacent relationship to each other therewithin, said bracket comprising:

an elongate plastic frame adapted to extend generally laterally of said automobile body, said frame including an upper edge portion, a lower base portion, an interconnecting discontinuous web portion, and a smooth rounded free end portion, said portions of said frame being substantially co-planar and said upper edge portion and said lower base portion merging at one end with said free end portion and being interconnected along their lengths by said web portion, said upper edge portion being adapted to extend generally horizontally and having a plurality of hanger-receiving notches spaced along its length, said lower base portion of said frame having an interiorally threaded bore extending angularly relative to said upper edge portion of said frame and projecting beyond said upper edge portion at the end thereof distal from said free end portion of said frame;

an annular member formed integrally with and extending upwardly from said frame adjacent the other end of said upper edge portion thereof, said annular member being adapted to receive said automobile hook member and suspend said frame therefrom;

an exteriorally threaded rod member mounted within said threaded bore of said lower base portion of said frame and having one end portion thereof projecting axially from said bore at approximately a 30° angle relative to said upper edge portion of said frame;

and an abutment member carried by said one end portion of said rod member for abutment with said automobile window and for positional adjustment relative to said window and said frame upon rotation of said rod member and ensuing movement thereof longitudinally of said bore.

6. A bracket as in claim 5, wherein said frame and said annular member are formed of plastic material adapted to break when subjected to severe impact stress, and wherein said abutment member comprises a generally cylindrical rubber member secured intermediate its length to said one end of said rod and extending substantially normal thereto.

7. A bracket as in claim 5, wherein said abutment member comprises a suction cup, and further including ball-and-socket means interconnecting said suction cup and said one end of said rod.

8. A bracket as in claim 5, wherein said frame and said rod are each formed of plastic material adapted to break when subjected to severe impact stress, and wherein said lower base portion of said frame has a plurality of weakening indentations therein communicating with said bore.

* * * * *